Dec. 30, 1969     A. L. TURNER     3,486,765
EASILY ASSEMBLED AND DISASSEMBLED MOTOR VEHICLE
Filed April 23, 1968     2 Sheets-Sheet 1
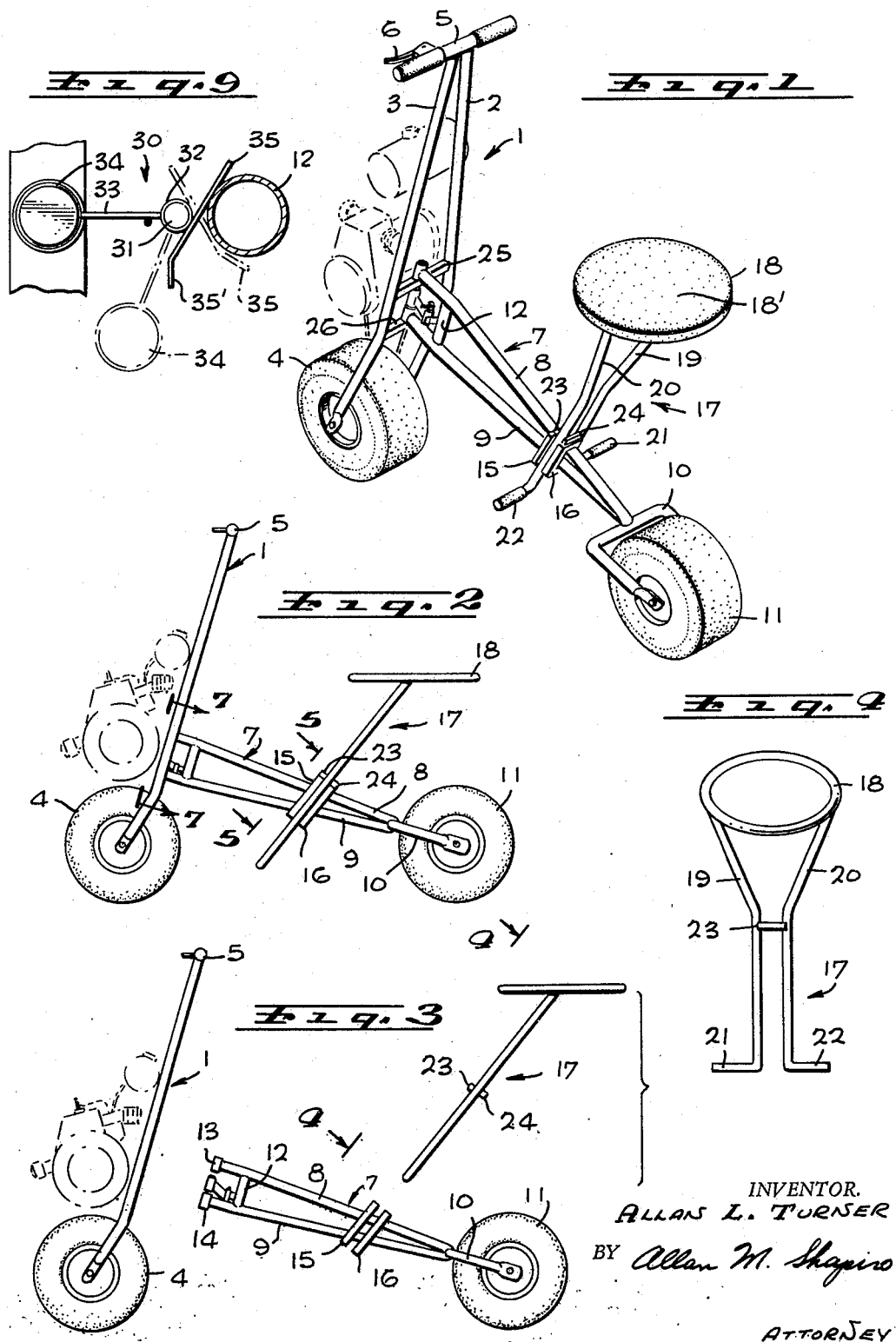
INVENTOR.
ALLAN L. TURNER
BY Allan M. Shapiro
ATTORNEY Dec. 30, 1969     A. L. TURNER     3,486,765
EASILY ASSEMBLED AND DISASSEMBLED MOTOR VEHICLE
Filed April 23, 1968     2 Sheets-Sheet 2
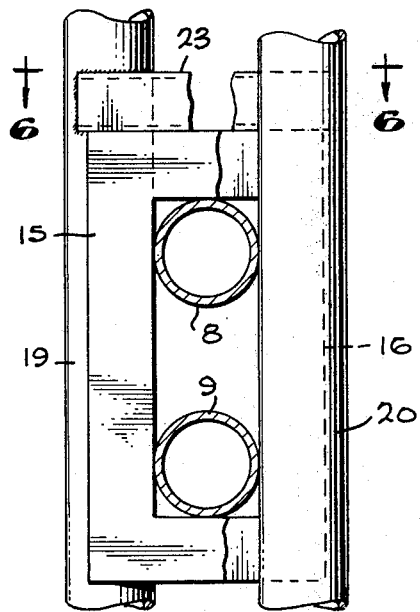
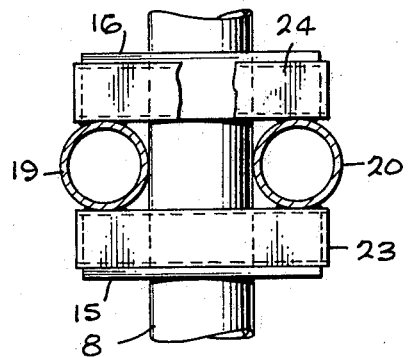
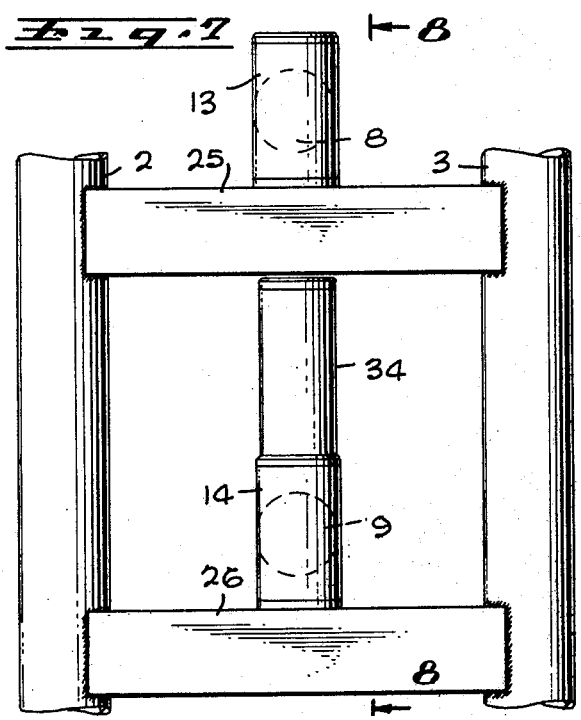
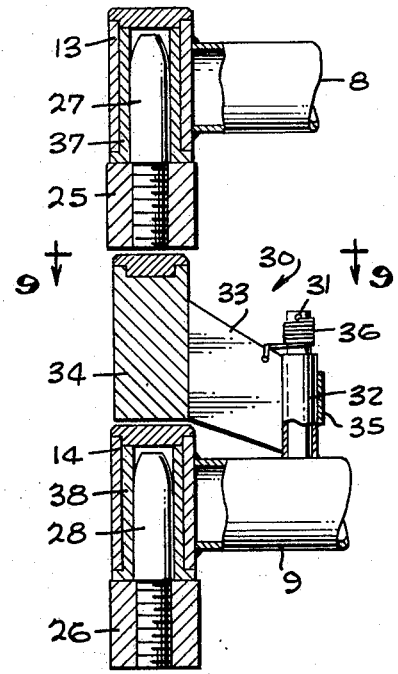
INVENTOR.
ALLAN L. TURNER
BY Allan M. Shapiro
ATTORNEY

United States Patent Office 3,486,765
Patented Dec. 30, 1969

3,486,765
EASILY ASSEMBLED AND DISASSEMBLED MOTOR VEHICLE
Allan L. Turner, 43946 N. Carolside Ave., Lancaster, Calif. 93534
Filed Apr. 23, 1968, Ser. No. 723,391
Int. Cl. B62k *19/00, 15/00, 11/02*
U.S. Cl. 280—278                     9 Claims

ABSTRACT OF THE DISCLOSURE

A two-wheeled motor vehicle is made to be easily assembled and disassembled by forming the vehicle in three detachable sections, a first section supporting the driving mechanism, the front wheel and the handlebars, a second section supporting the rear wheel and a third section supporting the seat and the foot rests. The second section has a pair of sleeves which fit over mating pins in the first section so as to secure the two section, and a locking mechanism to prevent the sections from being unintentionally disconnected. In addition, the support for the seat is made so as to slide through a pair of plates in the second section so as to be positioned therein.

BACKGROUND OF THE INVENTION

Field of the invention

The present inventon relates to disassemblable motor vehicles and, more particularly, to a construction of a motor vehicle of the motor scooter type so as to permit the vehicle to be easily assembled and disassembled for convenient transportation and storage.

Description of the prior art

Small power-driven and lightweight vehicles have been increasingly popular in recent years. Such vehicles, generally called motor scooters, have come into widespread usage, not only as a means of transportation in urban areas, such as for merchandise delivers and the like, but also for pleasure riding. Although such vehicles are particularly well suited for travelling relatively short distances, they are generally of very limited capacity in speed and, as a consequence, not well suited for long distance travel. It is, therefore, very frequently desirable to employ other means of transportation, such as airplanes, automobiles, or boats for travelling long distances and at the same time, carry a motor scooter for local travel after arriving at the destination. However, motor scooters have not been well suited for such use as they have been bulky and difficult to handle, as well as being inconvenient to store or transport in another vehicle.

Heretofore, a proposal to overcome this difficulty has been made by constructing motor scooters so that they are collapsible or disassemblable whereby the motor scooter could be folded or dismantled to fit into a relatively small space for ease in storage, transportation and handling. However, there have been many difficulties with such prior arrangements. Firstly, too many elements are often required to be taken apart or folded. In addition, the means for providing removable or foldable securement of these elements were so difficult to operate that tools were generally required. As a result, the dismantling and reassembling of the numerous parts was time-consuming and inconvenient. Further, past attempts to minimize such disadvantages have created additional problems in the insecurity of the various attachments.

SUMMARY OF THE INVENTION

According to the present invention, there is provided a motor vehicle which overcomes all of the foregoing difficulties. More particularly, in accordance with the pressent invention, a motor vehicle is provided which is easily and readily disassembled into a small number of compact parts for easy storage and which may be rapidly re-assembled for use. This is accomplished by providing a vehicle consisting of a plurality of separate sections that may be readily dismantled without any tools. Each of the sections, when dismantled, is a small, lightweight unit that may be easily handled and/or stored. The separate sections are readily assemblable into a complete and operative vehicle in a minimum amount of time, with little effort and without the use of any tools. In addition, the present motor vehicle, when fully assembled, is convenient and easy to use and safe to operate. Further, the vehicle is inexpensive to manufacture and distribute and does not require costly maintenance and repair.

Briefly, the present motor scooter consists of three sections. The first or front section is substantially vertically positioned and includes, at its lower end, the front wheel assembly and, at its upper end, the handlebars and driving controls. Intermediate the upper and lower ends is located the driving motor, gas tank and other related equipment. A second or rear section is substantially horizontally positioned and includes, at the rearward end thereof, the rear wheel assembly and, at the other or forward end, a pair of sleves which mate with a pair of pins located on the first section at a point intermediate its upper and lower ends. By slipping the sleeves over the pins, the first and second sections may be securely locked in position. Finally, the second section includes a pair of spaced apart plates which are located at a point intermediate the ends thereof and are adapted to receive and support a third or intermediate section which is substantially vertically disposed and includes a seat at its upper end and a pair of foot rests at its lower end.

It is therefore, an object of the present invention to provide a motor scooter which is easily assembled and disassembled.

It is a still further object of the present invention to provide a motor scooter consisting of three small, lightweight units which may be rapidly disassembled for ease in storage and handling.

Another object of the present invention is the provision of a motor vehicle consisting of separate sections which may be readily assembled into a complete and operative vehicle in a minmum amount of time without the use of any tools.

Still other objects and attendant advantages of the present invention will become apparent to those skilled in the art from a reading of the following detailed description of a preferred embodiment constructed in accordance therewith, taken in conjunction with the accompanying drawings wherein like numerals designate like parts in the several figures.

BRIEF DESCRIPTION OF THE DRAWINGS

FIGURE 1 is a perspective view of the present motor vehicle showing the motor and associated structures in phantom;

FIGURE 2 is a left side elevation view thereof;

FIGURE 3 is an exploded left side elevation view thereof having the same aspect as FIGURE 2;

FIGURE 4 is a view of the seat or intermediate portion alone as seen along line 4—4 in FIGURE 3;

FIGURE 5 is a fragmentary enlarged sectional view, partly in elevation and partly broken away, taken along line 5—5 in FIGURE 2 and showing the seat yoke arrangement;

FIGURE 6 is a fragmentary sectional view taken along line 6—6 in FIGURE 5;

FIGURE 7 is a fragmentary enlarged elevation view taken along line 7—7 in FIGURE 2 and generally showing the front yoke arrangement;

FIGURE 8 is a sectional view, partly in elevation, taken along line 8—8 in FIGURE 7 and showing the front end mounting and latching arrangement; and FIGURE 9 is a fragmentary plan view, partly in section, taken along line 9—9 in FIGURE 8, with the elements shown in phantom in the released position.

DESCRIPTION OF THE PREFERRED EMBODIMENT

Referring now to the drawings and, more particlarly to FIGURES 1–3 thereof initially, there is shown a motor scooter constructed in accordance with the teachings of the present invention. The present motor scooter consists of three sections. The first or front section, generally designated 1, consists of a pair of substantially vertically positioned laterally spaced tubular members 2 and 3 which support, at their lower ends, an axle (not shown) upon which is rotatably mounted the front wheel 4. Members 2 and 3 rigidly support, at their upper ends, a horizontally positioned tubular member 5 which functions as the handlebars. Mounted on handlebars 5 may be a brake handle 6 and other driving controls (not shown). To facilitate the easy assembly and disassembly of the present motor scooter, the driving motor, gas tank and other related equipment are all mounted on section 1. However, since the motor and its associated structures may be of any type well known in the art, they are shown only in phantom in FIGURES 1–3.

The second or rear section, generally designated 7, consists of a pair of substantially horizontally positioned vertically spaced tubular members 8 and 9 which are rigidly provided at first or rearward ends thereof with a substantially U-shaped tubular member 10 which supports a second axle (not shown) upon which is rotatably mounted the rear wheel 11. Members 8 and 9 forwardly diverge and are held in mutually spaced relationship at their forward or other ends by a tubular member 12. A pair of effectively vertically aligned sleeves 13 and 14 are provided at such forward ends of members 8 and 9, respectively, to facilitate the pivotal attachment of front and rear sections 1 and 7, as will be explained more fully hereinafter.

Positioned intermediate the forward and rearward opposite ends of rear section 7 are a pair of downwardly forwardly slanted parallel plates 15 and 16 which are secured as by welding onto members 8 and 9 so as to receive and support the third or intermediate unitary section, generally designated 17, which is integrally provided at its upper end with a seat ring 18. As seen in FIGURE 1, a cushioned seat pad 18′ may be disposed on and secured to the seat ring 18.

Referring now to FIGURE 4, intermediate section 17 includes a pair of laterally spaced tubular members 19 and 20 which have 90° bends at the lower ends thereof to provide a pair of foot rests 21 and 22, respectively. Members 19 and 20 diverge at the upper ends thereof to connect to the edge of seat ring 18 which may consist, most simply, of a circular tubular member for supporting the cushion pad 18′. Positioned intermediate the ends of and secured to members 19 and 20 are a pair of supporting crossbars 23 and 24, as shown most clearly in FIGURES 3 and 4, whose function will be explained more fully hereinafter.

Referring now to FIGURES 5 and 6, there is shown in greater detail the seat yoke arrangement consisting of spaced plates 15 and 16. As shown in FIGURE 5, plates 15 and 16 are generally rectangular in shape and are positioned around tubular members 8 and 9 and preferably welded thereto. Plates 15 and 16 are spaced apart by a distance which is slightly greater than the diameters of members 19 and 20 (see FIGURE 6). In addition, members 19 and 20 are spaced by a distance slightly greater than the diameter of members 8 and 9. In this manner, members 19 and 20 may be slid between plates 15 and 16, straddling members 8 and 9, until crossbars 23 and 24 come into contact with the top surfaces of plates 15 and 16, respectively (see FIGURES 1–3, 5 and 6). In this manner, rear unit 7 and intermediate unit 17 may be simply and efficiently assembled and disassembled without the need of any tools. In addition, the force of gravity, together with the weight of the operator on seat 18, will keep sections 17 and 7 together without the requirement for any latching mechanisms.

Referring now to FIGURES 1, 7 and 8, in order to facilitate the ready assembly and disassembly of the front and rear units or sections 1 and 7, front section 1 is provided with a vertically spaced parallel pair of horizontal bar members 25 and 26 which are secured as by welding at their ends to effectively vertical members 2 and 3. Members 25 and 26 are provided centrally with a pair of vertically aligned upwardly projecting pivot pins 27 and 28, respectively. As shown in FIGURE 8, pins 27 and 28 may be most conveniently attached to members 25 and 26 by providing the latter with internally threaded bores and the former with mating external threads along the lower shank portion for threaded engagement. Sleeves 13 and 14 at the ends of members 8 and 9, respectively, of the rear section 7 are adapted to fit over pins 27 and 28, respectively, to pivotally couple and support the front and rear units 1 and 7 onto each other. As seen in FIGURES 7 and 8, the vertical spacing between bar members 25 and 26 is more than the combined height of sleeve 14 and the projecting portion of pin 28, i.e., the vertical clearance between the top of pin 28 and the bottom of member 25 is greater than the overall height of sleeve 14, so that sleeve 14 may be readily inserted between pin 28 and member 25 without interfering with member 25 and then positioned over pin 28 while, simultaneously, sleeve 13 is positioned over pin 27.

It can be readily appreciated that the force of gravity, together with the weight of the driver on seat 18, will be sufficient to prevent sleeves 13 and 14 from being moved upwardly with respect to pins 27 and 28 so that, under normal operating conditions, front and rear sections 1 and 7 may not be unintentionally detached. However, as a safety feature and particularly in the event of road bounces, a locking mechanism may be included in order to insure that sections 1 and 7 cannot be inadvertently disassembled or uncoupled. As shown most clearly in FIGURES 7, 8 and 9, the disclosed inventive locking mechanism, generally designed 30, includes a pin 31 which integrally projects upwardly from the upper side of tubular member 9. Pin 31 rotatably supports a sleeve 32 integrally provided with a flange 33 which extends generally forwardly from the sleeve 32 and has a forward end integrally provided with a solid interference rod 34 whose outside diameter is approximately the same size as the outside diameter of sleeve 14. Also secured to sleeve 32 is a manually operable release lever and stop member 35. A spring 36 is connected between pin 31 and flange 33 so as to urge flange 33 and its rod 34 in a clockwise direction as viewed from above. Release and stop member 35 is secured to sleeve 32 at about the midpoint of member 35 so that, when rod 34 is positioned directly above sleeve 14, one end of member 35 is stopped against strut member 12 whereby rod 34 is maintained in vertical alignment with sleeve 14. In this manner, in the normal closed or operating position, rod 34 is held immediately between sleeve 14 and bar member 25 in vertical interference or movement obstruction relationship thereto, as shown in FIGURES 7, 8 and 9, so that sleeve 14 cannot be raised out of its pivotally engaged relationship with pin 28. On the other hand, to easily and simply disassemble sections 1 and 7 in a matter of a few seconds, release and stop member 35 may be readily manually rotated against the force of retaining spring 36 by means of lever end 35′, to the released position shown in phantom in FIGURE 9, whereupon sleeves 13 and 14 may be raised out of engaged relationship with pins 27 and 28.

It will be noted that, in the use of the vehicle, the front section 1 is pivotable about the common substantially vertical axes defined by the front section's pivot pins 27 and 28 and their corresponding sleeves 13 and 14, as during steering of the vehicle. In order to assure relatively frictionless pivoting action, as well as for economy of construction, the sleeves 13 and 14 may be provided with bearing inserts 37 and 38 which are press-fit into their respective sleeves fully up to their illustrated annular shoulders so as to be immovable relative to their sleeves; the interior and bottom surfaces of the bearing inserts 37 and 38 may be easily machined for smoothness and thus minimal friction in rotation about the pins 27 and 28 and upon the front crossbar members 25 and 26.

While particular embodiments of the present invention have been shown and described, it will be obvious to those skilled in the art that changes and modifications may be made without departing from this invention in its broader aspects.

What is claimed is:

1. In a motor vehicle of the scooter type having a wheeled front section and a wheeled longitudinal rear section pivotally coupled to each other by means of substantially vertical pin means and sleeve means rigidly extending from respective ones of such sections, the improvement in such pivotal coupling means for permitting easy coupling assembly and decoupling disassembly of such sections comprising:
    said pin means having a free end;
    said sleeve means having an open free end for receiving said free end of said pin means;
    an obstruction member secured to one of said sections and defining a space from the free end of that corresponding one of said pin and sleeve means which extends from such section, such space having a vertical height at least equal to the vertical height of the other one of said pin and sleeve means whereby such other one of said pin and sleeve means is horizontally insertable between and normally withdrawable from such corresponding one thereof and said obstruction member for selective coupling assembly and decoupling disassembly of said front and rear sections; and
    manually releasable lock means mounted on one of said sections and having a portion normally disposed in said space for normally preventing decoupling of said pin and sleeve means by interference obstruction of such decoupling movement.

2. The improvement as defined in claim 1 wherein:
    said portion of said lock means comprises a substantially vertical rod having a height slightly less than the height of said space; and
    said lock means includes a spring for normally urging said rod into said interference obstruction relationship position.

3. The improvement as defined in claim 2 wherein said lock means further comprises:
    a lock sleeve member pivotally mounting said lock means onto said one of said sections;
    a flange integrally interconnecting said lock sleeve member and said rod; and
    a manually operable release lever and stop means projecting from said lock sleeve member for automatically detaining pivotal movement of said lock sleeve member as urged by said spring when said rod is positioned in said interference obstruction relationship and for permitting manual pivoting thereof for removal of said rod from such position whereby said pin and sleeve means may be decoupled.

4. The improvement as defined in claim 1 comprising:
    said obstruction member comprises an upper crossbar secured to said front section;
    a lower crossbar secured to said front section in parallel to said upper crossbar;
    said pin means comprises a pin threadedly secured to said lower crossbar and having its said free end projecting upwardly toward said upper crossbar; and
    said sleeve means is secured to said rear section.

5. The improvement as defined in claim 4 comprising:
    said pin means comprises a second pin threadedly secured to said upper crossbar and projecting upwardly in axial alignment with said first mentioned pin; and
    said sleeve means comprises two axially aligned sleeves adapted for pivotal coupling with respective ones of said pins.

6. In a motor vehicle of the scooter type having a wheeled longitudinal section for supporting a seat portion and foot rests, the improvement in seat portion and foot rest mounting and support means for permitting easy assembly and disassembly thereof comprising:
    a pair of downwardly forwardly slanted parallel plates secured to said longitudinal section;
    a seat portion comprising a pair of symmetrical members adapted to slide downwardly between said plates in interference fit therewith for longitudinal stability and into interference fit with said longitudinal section for lateral stability; and
    crossbar means secured to both of said members and extending therebetween for limiting such downwardly sliding movement relative to said longitudinal section.

7. The improvement as defined in claim 6 wherein:
    each of said members has a lower end provided with an integrally laterally outwardly projecting foot rest;
    said plates extend laterally beyond both sides of said longitudinal section; and
    said members slide about both sides of said longitudinal section.

8. The improvement as defined in claim 7 wherein:
    said plates extend upwardly above said longitudinal section; and
    said crossbar comprises a pair of crossbars respectively secured forwardly and rearwardly of said members whereby each of said crossbars rests upon a corresponding one of said plates for such limiting relationship.

9. In a motor vehicle of the scooter type having a wheeled front section and a wheeled longitudinal rear section pivotally coupled to each other by means of substantially vertical pin means and sleeve means rigidly extending from respective ones of such sections, wherein the wheeled longitudinal section supports a seat portion and a foot rest, comprising, in combination:
    the improvement in such pivotal coupling means as defined in claim 1; and
    the improvement in seat portion and foot rests mounting and support means including said seat portion being slidably mounted on said longitudinal section;
    whereby said motor vehicle is easily manually disassembled into three pieces constituting said front section, rear section, and seat portion and easily manually assembled therefrom, such assembly and disassembly being repetitive as desired for use and non-use.

References Cited

UNITED STATES PATENTS

| | | | |
|---|---|---|---|
| 414,505 | 11/1889 | Featherstone | 280—279 |
| 2,593,247 | 4/1952 | Benteman | 280—515 |
| 3,195,923 | 7/1965 | Moulton | 280—281 |
| 3,419,283 | 12/1968 | Newland | 280—281 X |

FOREIGN PATENTS

| | | |
|---|---|---|
| 482,211 | 12/1916 | France. |
| 1,052,439 | 12/1966 | Great Britain |

KENNETH H. BETTS, Primary Examiner

U.S. Cl. X.R.

280—279, 287